US006122292A

United States Patent [19]
Watanabe et al.

[11] Patent Number: 6,122,292
[45] Date of Patent: Sep. 19, 2000

[54] DYNAMIC BAND ALLOCATION SYSTEM

[75] Inventors: Toshikatsu Watanabe; Makoto Oouchi, both of Koriyama, Japan

[73] Assignee: Hitachi Telecom Technologies, Ltd., Fukushima-ken, Japan

[21] Appl. No.: 09/038,018

[22] Filed: Mar. 11, 1998

[30] Foreign Application Priority Data

Mar. 11, 1997 [JP] Japan ................................. 9-55785

[51] Int. Cl.[7] .................................................... H04J 3/16
[52] U.S. Cl. ........................................... 370/468; 370/236
[58] Field of Search .................................. 370/236, 433, 370/468, 471, 395, 523, 528

[56] References Cited

U.S. PATENT DOCUMENTS

| | | | |
|---|---|---|---|
| 4,763,321 | 8/1988 | Calvignac et al. | 370/468 |
| 5,526,350 | 6/1996 | Gittins et al. | 370/468 |
| 5,682,386 | 10/1997 | Arimilli et al. | 370/468 |
| 5,946,323 | 8/1997 | Eakins et al. | 370/468 |

*Primary Examiner*—Huy D. Vu
*Assistant Examiner*—Alexander Boakye
*Attorney, Agent, or Firm*—Antonelli, Terry, Stout & Kraus, LLP

[57] ABSTRACT

A dynamic band allocation system wherein the bands of a SD-I line 20 are divided into a sub-rate band used by sub-rate units and a bit multiplex band, the sub-rate band being used as an on-demand band where a trunk and a channel are selected dynamically for connection according to demand, the bit multiplex band being divided into a fixed connection band and a fixed allocation band wherein terminals having a small speed unit are bit multiplexed so that the sum of the signaling speed of the terminals is closest to the speed of the sub-rate unit, and when call is originated from the terminal, selecting only the trunk matching its signaling speed for connection, and further dividing the on-demand band into areas for voice and for data, wherein the ratio of the division of voice/data is changed according to the traffic from time to time.

3 Claims, 7 Drawing Sheets

DYNAMIC BAND ALLOCATION SYSTEM

BACKGROUND OF THE INVENTION

The present invention relates to a dynamic band allocation system for use in a network formed by connecting a plurality of multiplexing devices with digital private lines, for example, super digital interface (SD-I) lines.

Further, the present invention relates to a dynamic band allocation system which enables, in the above-mentioned network, dividing of the channels of the SD-I line into a sub-rate multiplex band, which is a band for on-demand connection and/or a reserved connection and/or a fixed allocation connection and/or a fixed connection, and a bit multiplex band, which is a band for a fixed allocation connection and/or a fixed connection. As for the on-demand connection and/or the reserved connection and/or the fixed allocation connection, a trunk or a channel is selected actively (corresponding to every call) for connection to the opposing multiplexing device, and the on-demand connection and/or the reserved connection and/or the fixed allocation connection is divided into a voice band and a data band, wherein the ratio of division between the voice band and the data band can each be changed according to the traffic of each.

Figure 7:
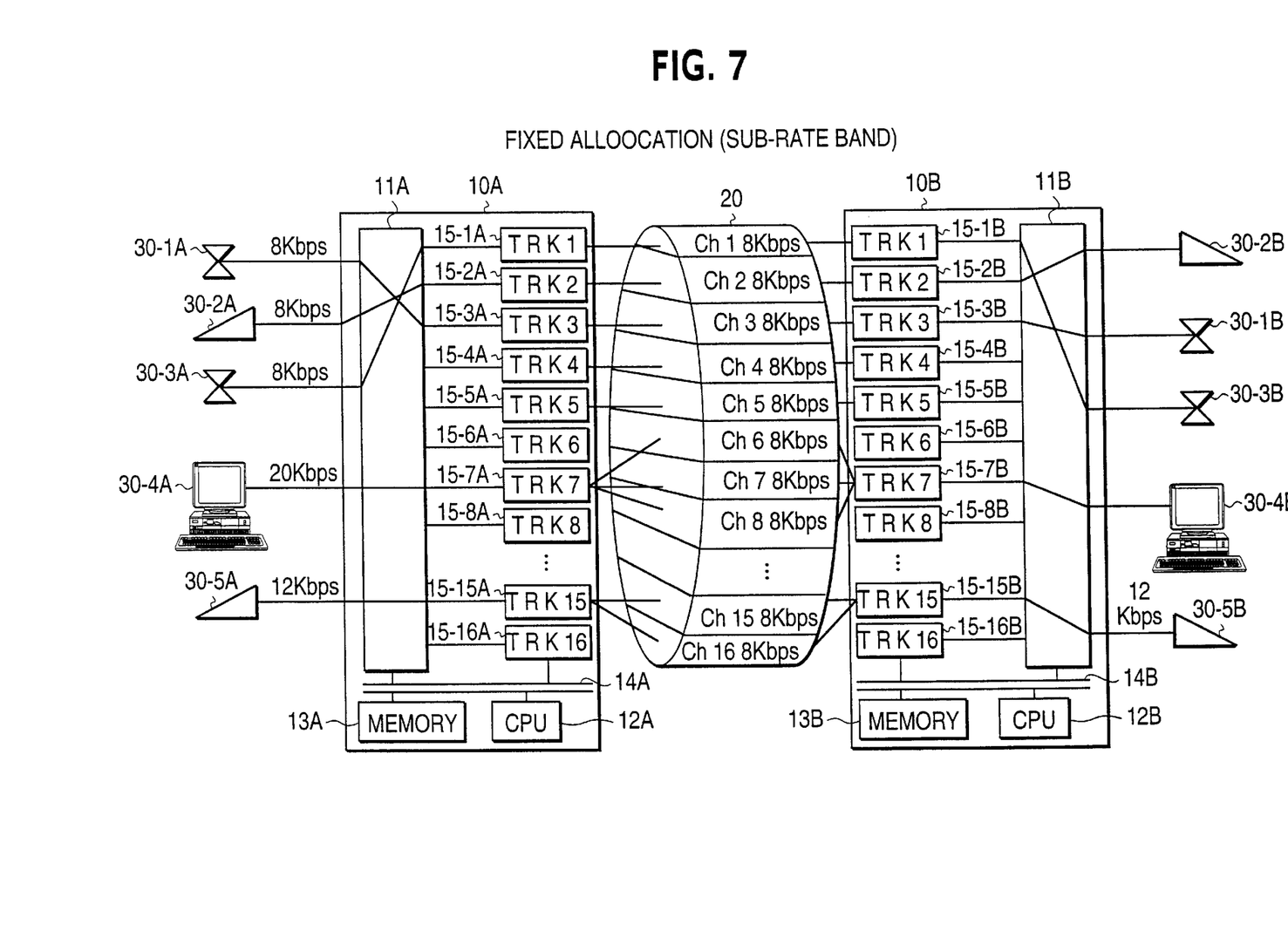
FIG. 7 is an explanatory view showing the structure of the data for managing the channel usage status of the sub-rate multiplex (on-demand/reserved band).

The structure of the network formed by connecting a plurality of multiplexing devices by an SD-I line is explained using FIG. 7. The network is formed, for example, by connecting a multiplexing device 10A, which is connected to terminal devices 30-1A through 30-5A, and a multiplexing device 10B, which is connected to terminal devices 30-1B through 30-5B, by an SD-I line 20. The multiplexing devices are not limited to two opposing devices, but more than three devices could be connected as a network. Each multiplexing device 10 includes a call path switch 11, a central processing unit 12, a memory device 13, a control bus 14 and a number of trunks 15.

In a network formed by connecting a plurality of such multiplexing devices by the SD-I line 20, the trunks 15 and the channels of the line 20 are set to be connected in advance by a fixed mode in each multiplexing device 10. Therefore, in the prior art, the dynamic band allocation system for dynamically allocating the band to the channel on the SD-I line was performed by selecting and connecting a trunk 15 which corresponds to the signaling speed of the terminal device 30 when the signal was originated from the terminal device 30.

That is, when a call was originated from a terminal device, such as a telephone machine, 30-3A having a signaling speed of 8 kbps, a trunk 15-1A connected to channel ch1 having a signaling speed of 8 Kbps might be selected for connection. Next, when another terminal device 30-2A having a signaling speed of 8 kbps originates a call, a trunk 15-2A connected to channel ch2 having a signaling speed of 8 kbps might be selected for connection. Further, when a further terminal device (telephone machine) 30-1A having a signaling speed of 8 kbps originates a call, a trunk 15-3A connected to channel ch3 having a signaling speed of 8 kbps might be seized for connection.

On the other hand, when a terminal device 30-4A having a signaling speed of 20 kbps originates a call, a trunk 15-7A connected to channels ch6 through, each having a signaling speed of 8 kbps, is seized for connection.

Further, a call originated from a terminal device 30-5A having a signaling speed of 12 kbps is connected to a selected trunk 15-15A which is connected to two channels, ch15 and ch16, each having a signaling speed of 8 kbps.

SUMMARY OF THE INVENTION

As was explained above, in a prior art connecting system wherein the connection between the trunks and the channels of the SD-I line are set in advance, and at the time of call origination from a terminal device, only a trunk connected to a channel of the SD-I line which has the corresponding signaling speed is selected for connection, there was a need to form a number of trunks with a combined signaling speed corresponding to the signaling speed of the originating terminal device (for example, 8 kbps/16 kbps and the like).

Further, in the prior system, when the terminal device having a signaling speed of 8 kbps originates a call and the trunks 15-1A through 15-5A connected to channels having a signaling speed of 8 kbps (ch1 through ch5) are all busy, even if the trunk 15-15A connected to channels ch15 and ch16 having a combined signaling speed of 16 kbps in the SD-I line and the channels ch15 and ch16 of the SD-I line are not presently being used, the terminal device could not originate a call. Therefore, the SD-I line and the trunks were not used efficiently.

The object of the present invention, therefore, is to provide a dynamic band allocation system for use in a network formed by connecting multiplexing devices by a digital private (SD-I) line which utilizes the SD-I line and the trunks efficiently.

In order to solve the above-mentioned problem, the present invention comprises the following in a dynamic band allocation system of a multiplexing device constituting a network connected by a digital private (SD-I) line:

(1) Dividing the band on the SD-I line into a sub-rate band, which can be used in a unit of 8 kbps for voice or data communication, and a bit multiplex band, which is secured in a unit of 8 kbps.

(2) Dividing the sub-rate band into an on-demand band, which selects and connects the trunks and the channels dynamically (for every call) according to each demand, a fixed allocation band for allocating the trunks and the channels in advance and only a trunk corresponding to the signaling speed of the terminal device is selected for connection when a call is originated from the terminal device, and a fixed connection band which is in a connected state at all times and which cannot be connected dynamically. Further, the on-demand band comprises an on-demand region which is connected according to demand, and a reserved region which corresponds only to the demand from a specific terminal.

(3) The bit multiplex band is a band for multiplexing the bit so that the sum of the speed of terminal devices having a low speed unit such as 1.2 kbps or 2.4 kbps and the like is closest to a speed of 8 kbps, wherein the bit multiplex band is divided into a fixed allocation band for allocating the trunks and the channels in advance and only the trunk corresponding to the signaling speed of the terminal device is selected for connection when a call is originated from the terminal device, and a fixed connection band which is in a connected state at all times and which cannot be connected dynamically.

(4) In the on-demand band, the trunks and the channels are divided into those for voice and those for data, and in the fixed allocation band, the trunks are likewise divided into those for voice and those for data.

(5) Observing traffic in each band in a predetermined interval, and based on the traffic from time to time, changing the ratio of the division for voice and for data regions.

(6) Widening the band for voice communication during the daytime when the amount of telephone use is heavy, and widening the band for data communication during the nighttime when the amount of telephone use is small.

Further, the present invention solves the above-mentioned problem by including the function explained below in a multiplexing device connected by the SD-I line for constituting the network:

(7) A central processing function for dividing and allocating the SD-I line into two bands, a sub-rate multiplex band and a bit multiplex band, and dividing the sub-rate multiplex band into an on-demand band, a fixed allocation band, and a fixed connection band, and dividing the bit multiplex band into a fixed allocation band and a fixed connection band, wherein the trunk and the channel can be selected according to every call, and as for the on-demand band, dividing the trunks and the channel into those for voice and those for data communication, and as for the fixed allocation band, dividing the trunks into those for voice and those for data communication.

(8) A central processing function with a function of observing the traffic of each band, and according to each band's traffic, changing, as for the on-demand (reserved) band of the trunk and the channel, and as for the fixed allocation band of the trunk, the ratio of division for voice and for data.

The present invention establishes a sub-rate multiplexing on-demand band on the SD-I line, and by enabling allocation of the trunks and the channels dynamically (according to every call) enables on-demand connections until either the trunks or the channels are in a busy state, and by dividing the sub-rate multiplexing on-demand band into areas for voice communication and for data communication, prevents use of all bands by either only voice or only data communication, and further, enables changing of the division of the band for voice or for data according to the traffic of voice or data communication.

Further, the present invention provides a bit multiplexing fixed allocation band on the SD-I line, enabling channel selection by terminal devices having smaller signaling speed units, which was only possible by 8 kbps units in the prior art.

The central processing function of the multiplexing device recognizes the class of the terminal device when it recognizes the origination of a call from the terminal device, and performs an origination process according to said terminal, and if origination is possible, sets the selected channel information and the class of the originator as a "call setup" message, and outputs the same to the opposing multiplexing device.

The opposing multiplexing device, on receiving the "call setup" message, extracts the channel information and the class of the originator inside the message, and selects the channel or the trunk belonging to the same band, enabling connection of the originator and the receiver location using the same band.

The central processing function detects the signaling speed of the terminal device, and when the speed unit is smaller than 8 kbps, multiplexes the calls of a plural number of terminal devices in the range where the sum of the signaling speeds of these plural number of terminal devices is under 8 kbps, enabling effective use of the channels.

Further, the central processing function divides the on-demand band and the fixed allocation band into those for voice and those for data, wherein each band's traffic is observed in a predetermined interval, and according to the traffic, the division ratio for voice or for data communication is changed. That is, in the daytime when the use of telephone (voice) is large, the band for voice communication is widened, and in the nighttime when the use of telephone (voice) is small, the band for data communication is widened.

By the above method, the SD-I line and the trunks can be used more efficiently.

PREFERRED EMBODIMENT OF THE INVENTION

First, the meaning of the terms related to each band used in the present specification will be explained.

In a network connected by an SD-I line, the present invention sets, for example, 16 channels of 8 kbps on an SD-I line of 128 kbps (64 kbps×2), and divides the channels into a sub-rate band and a bit multiplex band.

The sub-rate band is a band on the SD-I line which could be used by units of 8 kbps, and it can be classified into a voice band and a data communication band.

Further, the sub-rate band could be used by dividing it into an on-demand band, a fixed allocation band and a fixed connection band.

The bit multiplex band is a band which secures the whole band by 8 kbps units, and the band is used by multiplexing the bits of the low speed signals gathered by bit units. That is, a plurality of terminal devices with low signaling speed such as 1.2 kbps/2.4 kbps are subjected to bit multiplexing so that the band can be used efficiently.

The bit multiplex band could be divided into a fixed allocation band and a fixed connection band.

The on-demand band in the sub-rate band has the same features as the on-demand region in that they both could select the trunk of the multiplexing device and the channel of the line dynamically (for every call) for connection, but the on-demand band can further comprise a reserved region wherein the terminal device that can select this band is set optionally in advance, and only a call originated from the set terminal device can use said band.

The fixed allocation band of the sub-rate band is a band where the trunks of the multiplexing device and the channels of the line are allocated in advance, and when a call is originated from a terminal device, only the trunk which corresponds to the signaling speed of the terminal device is selected for connection.

The fixed connection band of the sub-rate band is a band where the connection between the terminal device, the trunk and the channel is set in advance, and where no dynamic connection can be performed.

The fixed allocation band of the bit multiplex band is a band where the trunks of the multiplexing device and the channels of the line are allocated in advance, and when a call is originated from a terminal device, the trunk corresponding to the signaling speed of the terminal device is selected for connection, and communication is performed by a bit multiplex method.

The fixed connection band of the bit multiplex band is a band where the connection between the terminal device, the trunk and the channel is set in advance for bit multiplex communication, and where no dynamic connection is possible.

The embodiment of the dynamic band allocation system will be explained hereinafter.

First, the concept of the structure of the multiplexing device 10 in the network for applying the dynamic band allocation system according to the present invention, and the movement (system) of the switching between the trunks 15 and the SD-I line 20 when connecting them by a sub-rate multiplex (by on-demand or reserved) method is explained with reference to FIG. 1.

Figure 1:
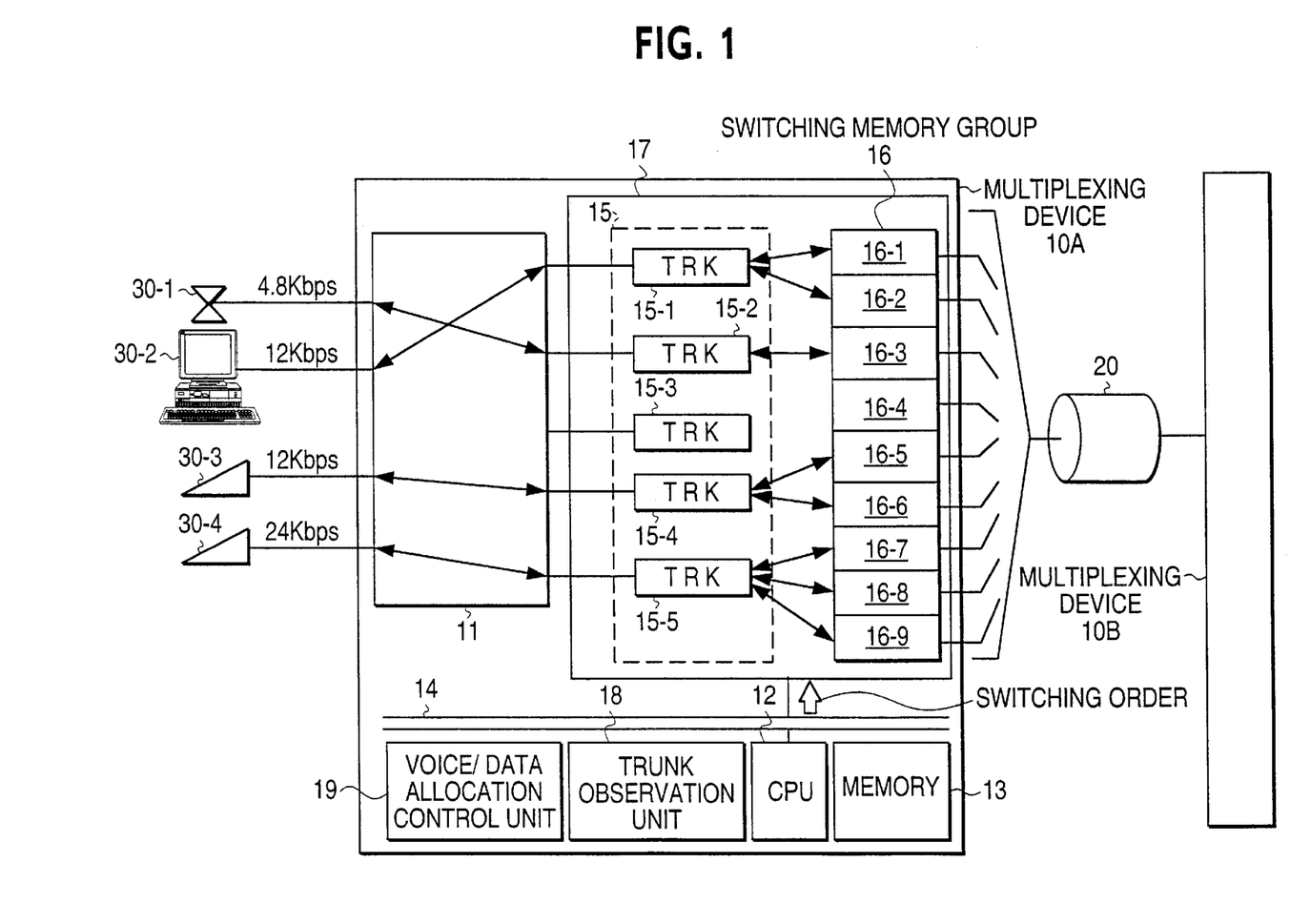
FIG. 1 is a concept view of a structure of the multiplexing device network capable of applying the dynamic band allocation system according to the present invention.

FIG. 1 explains the connecting method of the on-demand band including the reserved region in the sub-rate multiplex band of the multiplexing device 10. In the drawing, the other connecting bands, such as the fixed allocation and the fixed connection in the sub-rate band and the fixed allocation and the fixed connection in the bit multiplex band, are omitted.

The multiplexing device 10 according to the present embodiment comprises a call path switch 11, a central processing unit 12, a memory unit 13, a control and data bus 14, a line connecting unit 17 comprising a trunk group 15 and a switching memory group 16, a trunk observation unit 18, and a voice/data (V/D) allocation control function unit 19.

The call path switch 11 accomodates a plurality of terminal devices 30-1 through 30-4, and is connected to trunks 15-1 through 15-5 of the line connecting unit 17.

The line connecting unit 17 is connected in a fixed manner to each channel of the SD-I line through switching memories 16-1 through 16-9.

In the present example, the trunk group 15 is constituted as on-demand trunks for on-demand regions and reserved regions, wherein the trunks 15-2 and 15-5 are set as reserved trunks.

Upon detecting a call origination from the terminal devices 30-1 through 30-4 connected to the multiplexing device 10A, the call path switch 11 connects the calling terminal device to the trunk 15 having the corresponding signaling speed based on the signaling speed and the like of the terminal device. Further, the call path switch 11 connects the call received from the SD-I line 20 to the trunk 15 to the corresponding terminal device out of the terminal devices 30-1 through 30-4. That is, the call path switch 11 operates a switching movement according to every call, and selectively connects the terminal device connected in a fixed state to a port of the call path switch and the trunk 15 connected in a fixed state to the call path switch 11.

The central processing unit 12 controls the operation of the whole multiplexing device 10.

The memory unit 13 stores a variety of programs such as a multiplexing device control program and a variety of data, together with a variety of tables storing a variety of conditions, such as whether each of the terminal devices connected to the multiplexing device is a reserved terminal or the signaling speed (class) of each terminal device.

The line connecting unit 17 selectively connects the trunk 15 connected in a fixed state to the call path switch 11, and a switching memory 16 connected in a fixed state to each of the channels in the SD-I line 20.

The trunk observation unit 18 observes the traffic on the trunk 15 periodically and recognizes the state of the traffic in the voice band and in the data band.

The V/D allocation control function unit 19 controls the allocation of the voice band (D) and the data band (V) according to the observed traffic.

Further, the multiplexing device 10A is connected to an opposing multiplexing device 10B through the SD-I line 20.

As the SD-I line 20, a communication line having a signaling speed in the range of 128 kbps through 6 Mbps could be used. In the present specification, the line having a signaling speed of 128 kbps is used for explanation.

In the above-mentioned network, when a call is originated from a terminal device 30 connected to the multiplexing device 10, the call is recognized by the central processing unit 12, and the origination class stored in the memory unit 13 corresponding to the terminal device 30 is extracted.

When the originating terminal device is not reserved, the central processing unit 12 selects a trunk 15 according to the extracted originating class, and selects a switching memory 16 that is connected in a fixed state to a channel of the SD-I line 20 for connection to said trunk 15, so that an on-demand connection is performed in the sub-rate band.

When the originating terminal is reserved, the central processing unit 12 selects a trunk 15 according to the extracted reservation data, and selects a switching memory 16 that is connected in a fixed state to channel of the SD-I line 20 for connection to said trunk 15, so that a reserved connection is performed in the sub-rate band.

For example, when 16 channels, each having an 8 kbps (sub-rate multiplex) channel, is set to the SD-I line 20, and when a call is originated from the terminal device 30-2 of 12 kbps connected to the multiplexing device 10, the call origination is recognized by the central processing unit 12, and the unit refers to the memory unit 13 for extracting the originating class (signal speed) inputted with respect to the terminal device 30-2. In this case, the data that the signal speed is 12 kbps and that the terminal is not reserved is extracted.

Upon origination of a call, the central processing unit 12 seizes a vacant trunk 15-1 which is not reserved, and when it recognizes a connection completed from the. opposing multiplexing device, outputs to the line connecting unit 17 a switching order instructing the switching between trunk 15-1 and switching memories 16-1 and 16-2 to connect the seized trunk 15-1 and channels corresponding to the signal speed of the terminal device 30-2 or 12 kbps, which in this case is two channels.

The line connecting unit 17, upon receipt of the switching order, performs the switching between the trunk 15-1 and the switching memories 16-1 and 16-2 based on the order, forming a call path through the SD-I line 20 and the trunk 15-1, and at the same time, closes the call path switch 11 of the terminal device 30-2 and the trunk 15-1 to form a call path between the terminal device 30-2 and the line 20.

Next, the central processing unit 12 sets the channel information and the originating class in a "call setup" message, and outputs the same to the opposing multiplexing device 10B through a Dp channel.

Upon receipt of the "call setup" message, the opposing multiplexing device 10B extracts the channel information and the call originator class in the message, and based on said information, selects a channel and a trunk. Thereafter, a normal connecting process is performed.

By the above-mentioned structure, the same channel could be selected between the multiplexing device 10A and the multiplexing device 10B, enabling connection.

Thereafter, when a call is originated from the terminal device 30-1 of 4.8 kbps which is a reserved terminal device of the sub-rate multiplex on-demand band, the central processing device 12 extracts the signaling speed and the reservation information, seizes the vacant on-demand trunk 15-2, and selects a switching memory 16-3 connected in a fixed state to the channel of the SD-I line 20 which is capable of transmitting the extracted class or signaling speed of 4.8 kbps for connection.

Further, when a call is originated from a terminal device 30-4 of 24 kbps on the sub-rate multiplex on-demand reserved band, the central processing unit 12 extracts the signaling speed, seizes the vacant on-demand trunk 15-5, and connects the seized trunk 15-5 and the selected three channels of the switching memories 16-7 through 16-9 each connected in a fixed state to the channels of the SD-I line 20 which is capable of transmitting the extracted class, or signaling speed of 24 kbps.

Thereafter, the same process will be performed, so when a corresponding number of vacant channels are available in the SD-I line 20, the number of vacant channels corresponding to the signaling speed of the originator can be selected, and efficient use of the line could be realized.

Figure 2:
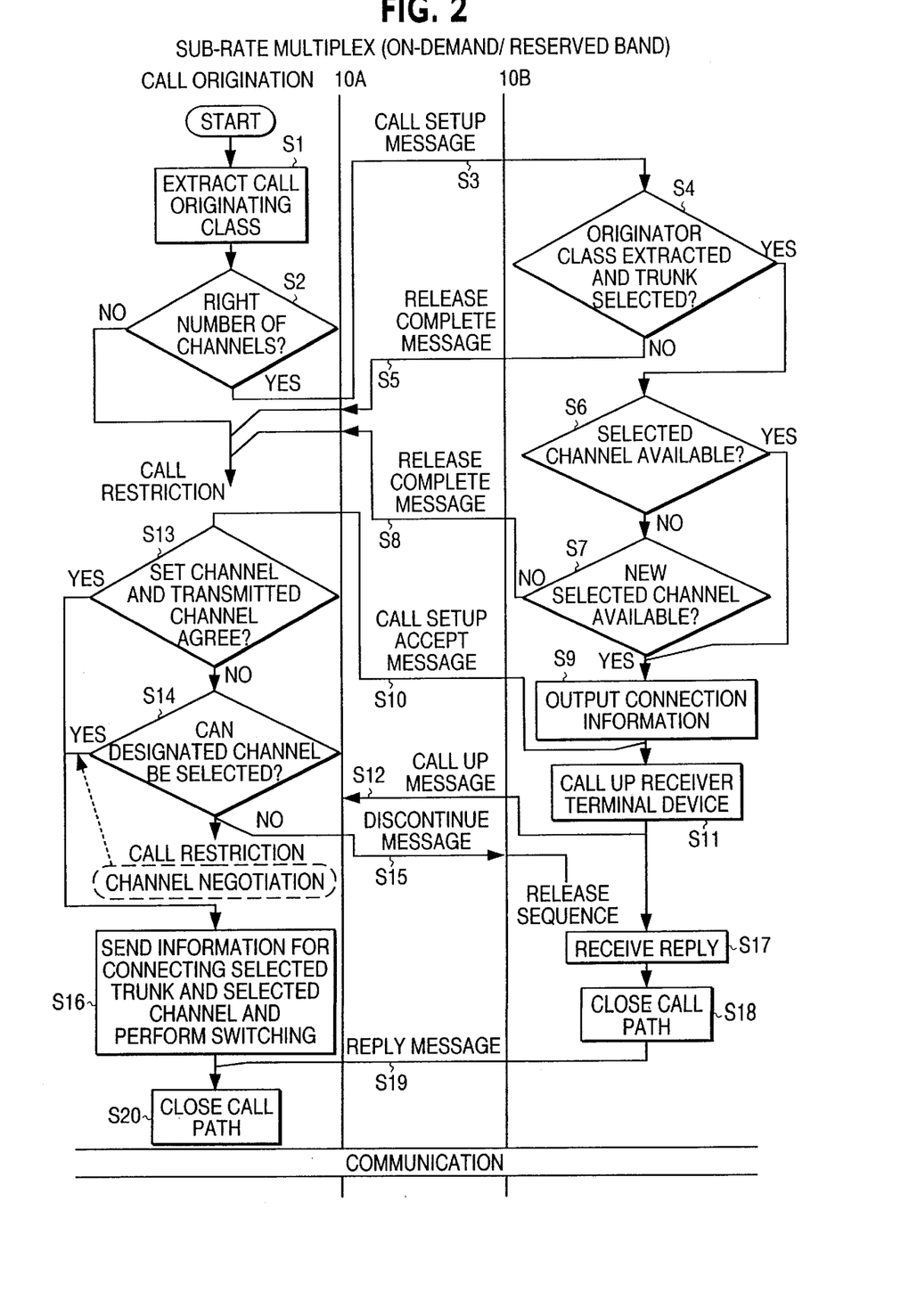
FIG. 2 is an explanatory view showing the system of the sub-rate multiplex switching of the line connection unit which performs the control for connecting the trunk installed inside the multiplexing device and the SD-I line.

FIG. 2 is used for explaining the connecting sequence when connecting the originating multiplexing device 10A and the receiver multiplexing device 10B by a sub-rate multiplexing (on-demand band (reserved region)).

Upon receipt of the call originated from a terminal device stored in the multiplexing device 10A, the central processing unit 12 extracts the originating class regarding the signaling speed corresponding to the originating terminal device 30 stored in the memory unit 13 (S1), and selects the trunk having the signaling speed corresponding to said class, and seizes a number of channels corresponding to the signaling speed of the class (S2).

By the result of selecting the trunk and the channel, when no trunk or channel satisfying the signaling speed of the originating terminal device 30 can be seized, then a call restriction process is performed against the originating terminal device 30.

By the result of selecting the above at step S2, when the trunk and the channel satisfying the signaling speed of the originating terminal device 30 can be seized, then the selected channel information and the class of the originator will be set in the "call setup" message on the Dp channel, and outputted to the opposing receiver multiplexing device 10B (S3).

Upon receipt of said "call setup" message, the receiver multiplexing device 10B extracts the originator class in the message, and selects a trunk according to said class (S4).

By the result of selecting the trunk, when no trunk satisfying the signaling speed of the originating terminal device 30 could be seized, then the device outputs a "release complete" message through the Dp channel to the originating multiplexing device 10A, rejecting call (S5).

Upon receipt of said "release complete" message, the originating multiplexing device 10A performs a call restriction process, and terminates the call control.

As a result of the trunk selecting process in step S4, when a trunk satisfying the signaling speed of the originating terminal device 30 can be seized, then the channel designated by the "call setup" message is selected (S6).

When the channel to be selected is busy and cannot be selected, another channel capable of use in the signaling speed (band) of the channel designated by the "call setup" message is selected (S7).

When no other channel could be selected in step S7, then a "release complete" message is outputted to the originating multiplexing device 10A through the Dp channel, rejecting the call (S8). Upon receipt of the "release complete" message, the originating multiplexing device 10A performs a call restriction process, and terminates the call control.

When the channel designated by the "call setup" message from the originating multiplexing device 10A could be selected in step S6, or if another channel could be selected in step S7, information (switching order) for connecting the selected trunk and the selected channel will be outputted to the circuit connecting unit (S9), performing switching of the trunk and the channel, and a "call setup accept" message will be outputted to the originating multiplexing device 10A, message including the selected channel information, through the Dp channel (S10)

Along with the output of the "call setup accept" message of step 10, the device calls up the receiver terminal device which is the object of the call (S11), and sends out a "call up" message to the originating multiplexing device 10A (S12).

Upon receipt of the above-mentioned "call setup accept" message, the originating multiplexing device 10A checks the channel information included in the "call setup accept" message, and determines whether it corresponds to the already selected channel (S13).

In step S13, when the set channel and the channel transmitted from the receiver multiplexing device 10B does not correspond (disagree), then the selected channel is set to an idle condition, and selects the channel designated by the receiver multiplexing device 10B (S14).

As a result of the channel selecting process of step S14, when the channel designated from the receiver multiplexing device 10B is used and could not be selected, then a "disconnect" message is sent out through the Dp channel to the receiver multiplexing device 10B (S15), terminating the call control by call restriction.

Upon receipt of the "disconnect" message of step S15, the receiver multiplexing device 10B performs a release sequence and terminates the call connection process.

When the channel designated by the receiver multiplexing device 10B and the channel selected at step S13 correspond (agree), or when the channel designated by the receiver multiplexing device 10B could be selected (this channel changing function is called channel negotiation), then information for connecting the selected trunk and the selected channel (switching order) will be sent out to the line connecting unit (S16), and the switching between the trunk and the channel is performed.

By the above-explained steps, the connection between the line connecting unit of the originating multiplexing device 10A and the line connecting unit of the receiver multiplexing device 10B is completed.

Thereafter, when the terminal device connected to the receiver multiplexing device replies (S17), the receiver multiplexing device 10B closes the call path switch between the trunk and the terminal device (S18), and sends out a "reply" message to the originating multiplexing device 10A (S19).

Upon receipt of the "reply" message of step S19, the originating multiplexing device 10A closes the call path switch between the trunk and the terminal device (S20), and the call path between the terminal device of the originating multiplexing device 10A and the terminal device of the receiver multiplexing device 10B is connected, enabling communication.

Figure 3:
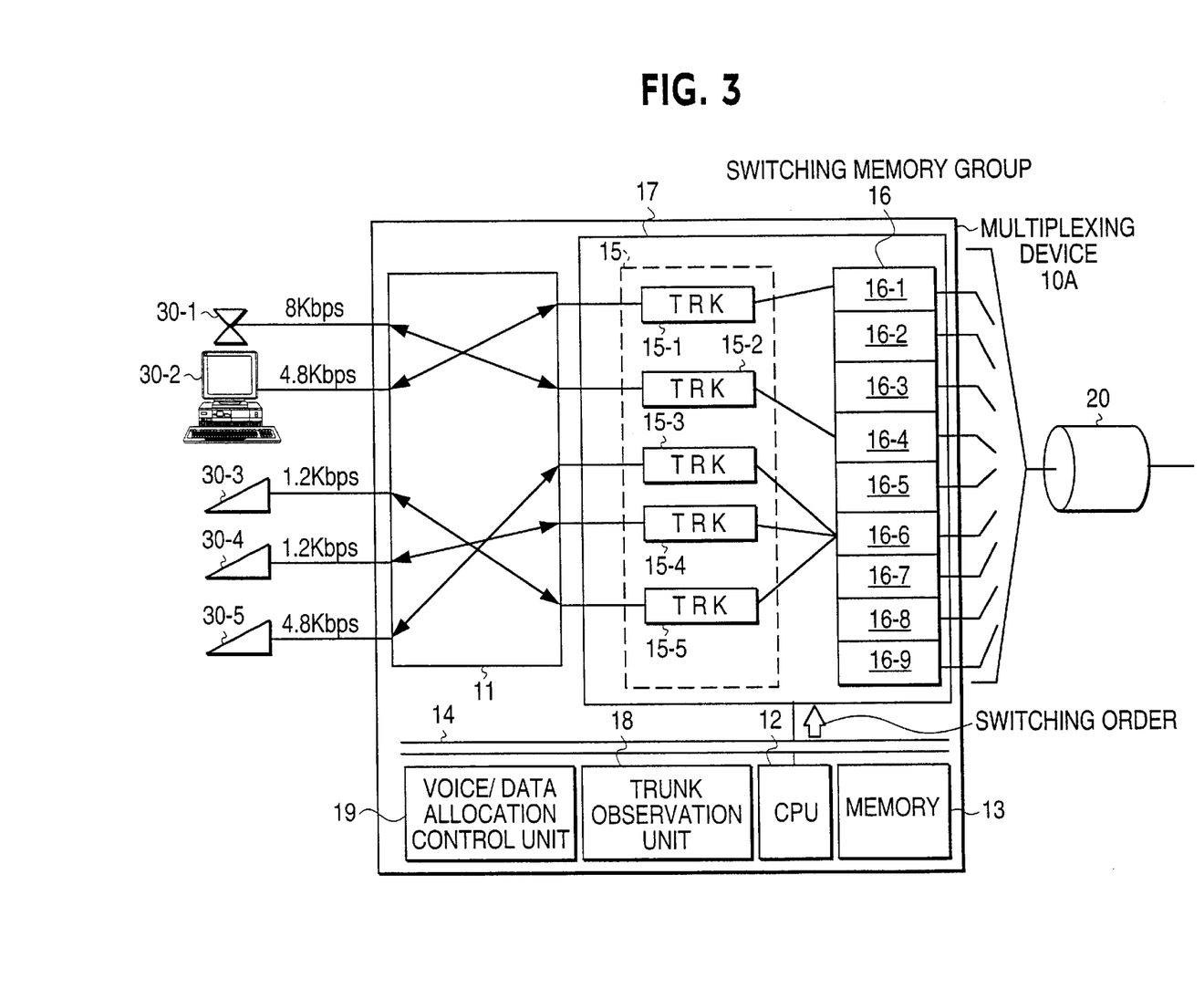
FIG. 3 is an explanatory view showing the system of the sub-rate multiplex/bit multiplex switching of the line connection unit which performs the control for connecting the trunk installed inside the multiplexing device and the SD-I line.

Another embodiment of the dynamic band allocation system according to the present invention is explained with reference to FIG. 3.

The operation (system) of the switching between the trunk 15 and the SD-I line 20 will be explained in the case where connection is performed in a fixed allocation method in the sub-rate multiplex band and the bit multiplex band.

The present embodiment as well as the other explanation only concerns the fixed allocation method, so other connections such as the on-demand connection or the fixed connection regarding the trunk are omitted.

The multiplexing device regarding the present embodiment comprises of a call path switch 11, a central processing unit 12, a memory unit 13, a control and data bus 14, a line connecting unit 17 comprising a trunk group 15 and a switching memory group 16, a trunk observation unit 18, and a voice/data (V/D) allocation control unit 19.

The call path switch 11 accomodates a plurality of terminal devices 30-1 through 30-5 and is connected to trunks 15-1 through 15-5 of the line connecting unit 17 in a fixed state.

Further, the line connecting unit 17 is connected in a fixed state to each channel of the SD-I line 20 through switching memories 16-1 through 16-9.

In the present embodiment, the trunk group 15 is constituted of trunks for a sub-rate multiplex band and bit multiplex band, wherein trunks 15-1 and 15-2 are used as a sub-rate multiplex band trunk, and trunks 15-3 through 15-5 are used as a bit multiplex band trunk.

In the present invention, the switching memory 16, connected in a fixed state to the channels of the SD-I line 20, and the trunks 15 are allocated in a fixed state. The trunk 15 could be set to a variety of signaling speeds in advance, for example, by using a plurality of channels, or by multiplexing the bit in one channel, according to the connection with the switching memory 16.

The call path switch 11 connects the call originated from one of the terminal devices 30-1 through 30-5 to a trunk 15 with a corresponding signaling speed.

The central processing unit 12 controls the operation of the whole multiplexing device 10.

The memory unit 13 stores a variety of programs such as a multiplexing device control program, a variety of data, and a variety of tables such as a table including the communication class corresponding to each terminal device, and a table storing a variety of conditions corresponding to each of the terminal devices, to such as their signaling speed (class).

In a network applying this fixed allocation system, when a call is originated from a terminal device 30 connected to the multiplexing device 10, the central processing unit 12 recognizes the origination, and refers to the memory unit 13 to extract the call originating class stored corresponding to the terminal device 30.

The central processing unit 12 controls the call path switch 11 so as to select a trunk 15 having a signaling speed corresponding to the extracted class.

For example, when a call is originated from the data terminal device 30-2 having a speed of 4.8 kbps connected to the multiplexing unit 10, the central processing device 12 seizes a vacant trunk 15-1 having a speed of 8 kbps, and controls the call path switch 11 to connect the origination device and the trunk.

Next, when a call is originated from the voice terminal device 30-1 having a speed of 8 kbps connected to the multiplexing device 10, the central processing unit 12 seizes a vacant trunk 15-2 having a speed of 8 kbps, and controls the call path switch 11 to connect the origination device and the trunk.

On the other hand, when a call is originated from a terminal device 30-3 having a speed of 1.2 kbps, the central processing unit 12 seizes a bit multiplexing vacant trunk 15-5 allocated to the switching memory 16-6 corresponding to the signaling speed, and controls the call path switch 11 to connect the origination device and the trunk.

Similarly, when a call is originated from a terminal device 30-4 having a speed of 1.2 kbps, the central processing unit 12 seizes a bit multiplexing vacant trunk 15-4 allocated to the switching memory 16-6 corresponding to the signaling speed, and controls the call path switch 11 to connect the origination device and the trunk.

By such method, a sum of 7.2 kbps terminals can be connected to the switching memory 16-6 by bit multiplexing, so a channel having a speed of 8 kbps can be utilized effectively.

Figure 4:
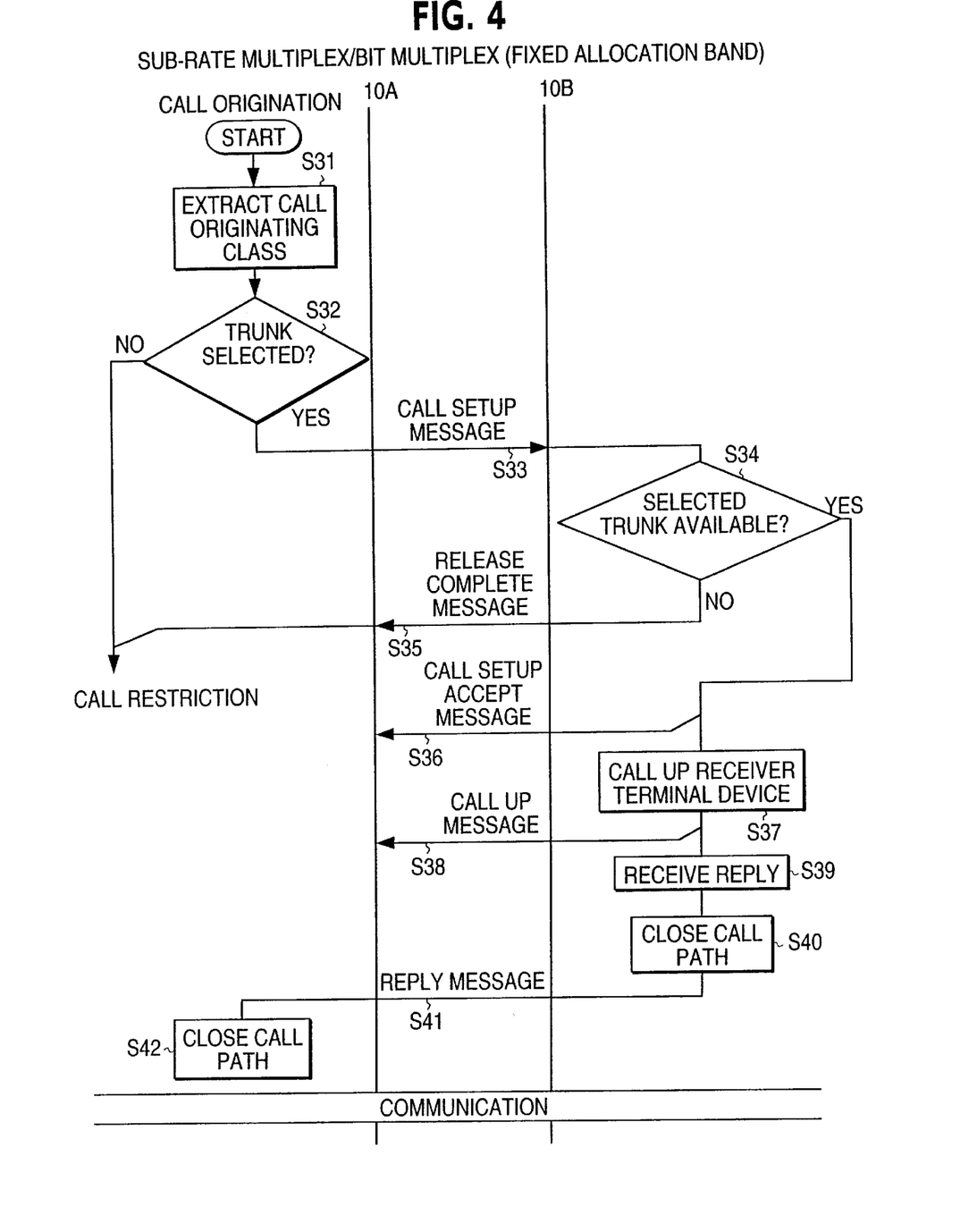
FIG. 4 is an explanatory view showing the connecting sequence of the sub-rate multiplex (on-demand/reserved band)

FIG. 4 is used to explained the connecting sequence of the originating multiplexing device 10A and the receiver multiplexing device 10B by a sub-rate multiplexing (fixed allocation band) and a bit multiplexing (fixed allocation band).

Upon receipt of a call origination from a terminal device connected to the originating multiplexing device 10A, the central processing unit 12 extracts the call originating class regarding the signaling speed corresponding to the originating terminal device stored in the memory unit 13 (S31), and selects a trunk allocated to a channel corresponding to said class (S32).

In the trunk selection process of step S32, if the selection could not be performed, then a call restriction process is performed against the originating terminal device.

In the trunk selection process, when the trunk can be selected, then the selected trunk information (or the channel information allocated in a fixed state thereto) and the class of the originator is set to the "call setup" message, which is then transmitted to the opposing receiver multiplexing device 10B through a Dp channel (S33).

Upon receipt of said "call setup" message, the opposing receiver multiplexing device 10B extracts the originator class and trunk information from the message, and selects a trunk according to said class (S34) (in this selection, the trunk allocated to the channel which is the same channel allocated to the trunk selected by the originating multiplexing device 10A is selected).

When the trunk designated in the "call setup" message could not be selected at the trunk selecting process of step S34, a "release complete" message is sent out to the originating multiplexing device 10A (S35), and rejects the call. Upon receipt of the "release complete" message, the originating multiplexing device 10A performs a call restriction process, and terminates the call control.

In the trunk selecting process of step S34, if the trunk designated by the "call setup" message could be selected, then a "call setup accept" message is transmitted to the originating multiplexing device 10A (S36), and calls up the receiver terminal device of the call (S37), and transmits a "call up" message to the originating multiplexing device 10A (S38).

Thereafter, when the called up terminal device replies (S39), the receiver multiplexing device 10B closes the call path switch between the trunk and the terminal device (S40), and sends out a "reply" message to the originating multiplexing device 10A (S41).

Upon receipt of the "reply" message of step S41, the originating multiplexing device 10A closes the call path switch between the trunk and the terminal device (S42), so that the call path between the terminal device of the originating multiplexing device 10A and the terminal device of the receiver multiplexing device 10B is connected and communication is made possible.

By the above steps, according to the present embodiment, when a call is originated from a terminal device in a sub-rate multiplex band or a bit multiplex band, a trunk (channel) corresponding to the class of the terminal is selected, and connection is performed by a fixed allocation method.

Figure 5:
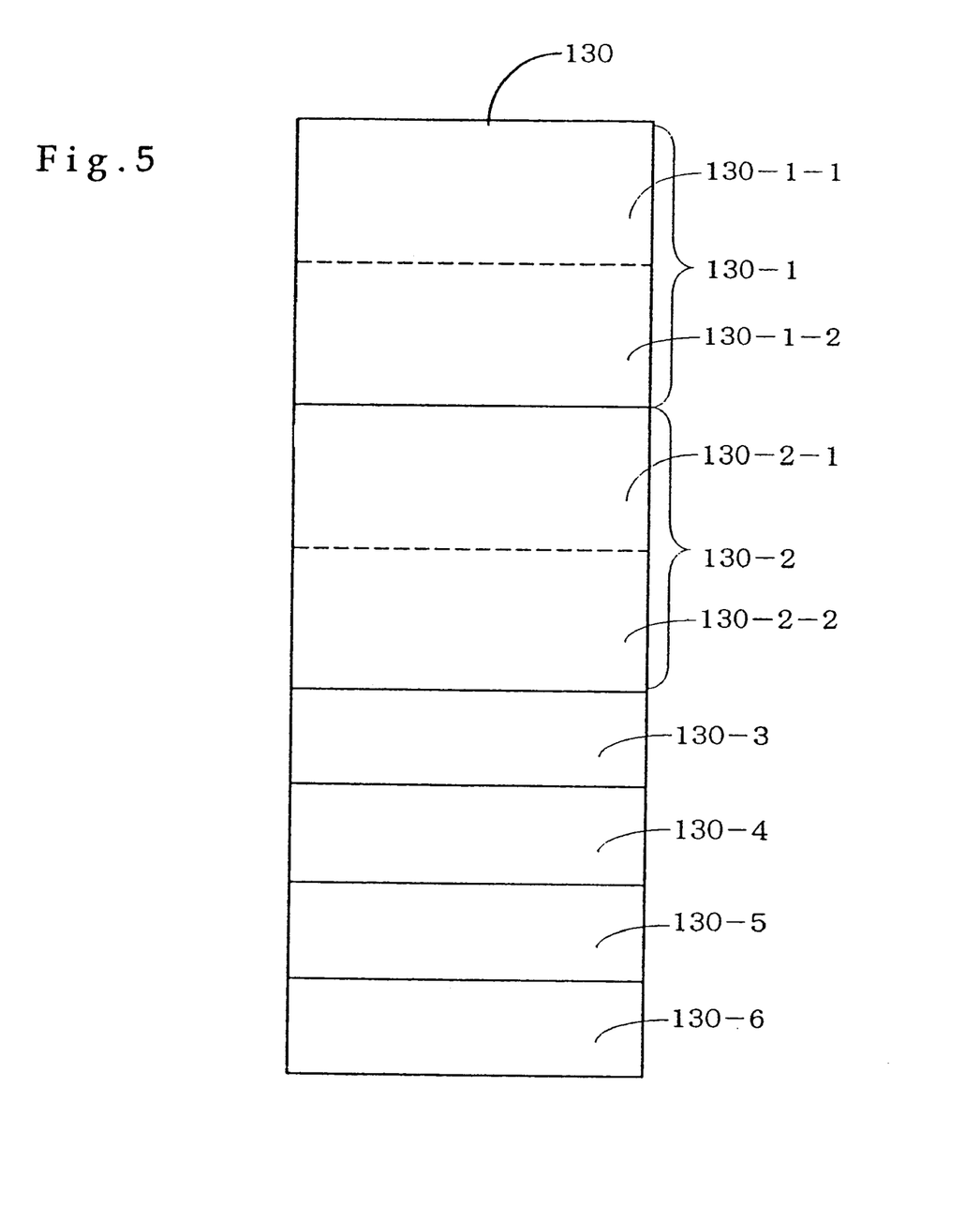
FIG. 5 is an explanatory view showing the connecting sequence of the sub-rate multiplex/bit multiplex (fixed allocation band)

FIG. 5 is used to explain one embodiment of the data structure to control which channel on the SD-I line 20 (64 kbps unit) is used for what band.

In this explanation, an example is presented wherein a plurality of 64 kbps unit channels is formed on the SD-I line, where each channel is utilized by a sub-rate multiplex and bit multiplex method.

A channel used band managing table 130 is equipped provided inside the memory unit 13.

The channel used band managing table 130 comprises an area 130-1 for storing the band used for sub-rate multiplex on-demand, an area 130-2 for storing the band used for sub-rate multiplex on-demand (reserved), an area 130-3 for storing the band used for sub-rate multiplex (fixed allocation), an area 130-4 for storing the band used for sub-rate multiplex (fixed connection), an area 130-5 for storing the band used for bit multiplex (fixed allocation), and an area 130-6 for storing the band used for bit multiplex (fixed connection).

The area 130-1 for storing the band used for sub-rate multiplex on-demand and the area 130-2 for storing the band used for sub-rate multiplex on-demand (reserved) are each formed so that two kinds of channel information, for voice and for data, can be divided and managed separately.

They are formed so that the ratio of division of the band for voice and for data can be changed according to the traffic of each band.

In each area, a start channel of the used band and the end channel of the band are stored, and when the band is used, only the channel from the start channel to the end channel is used.

Figure 6:
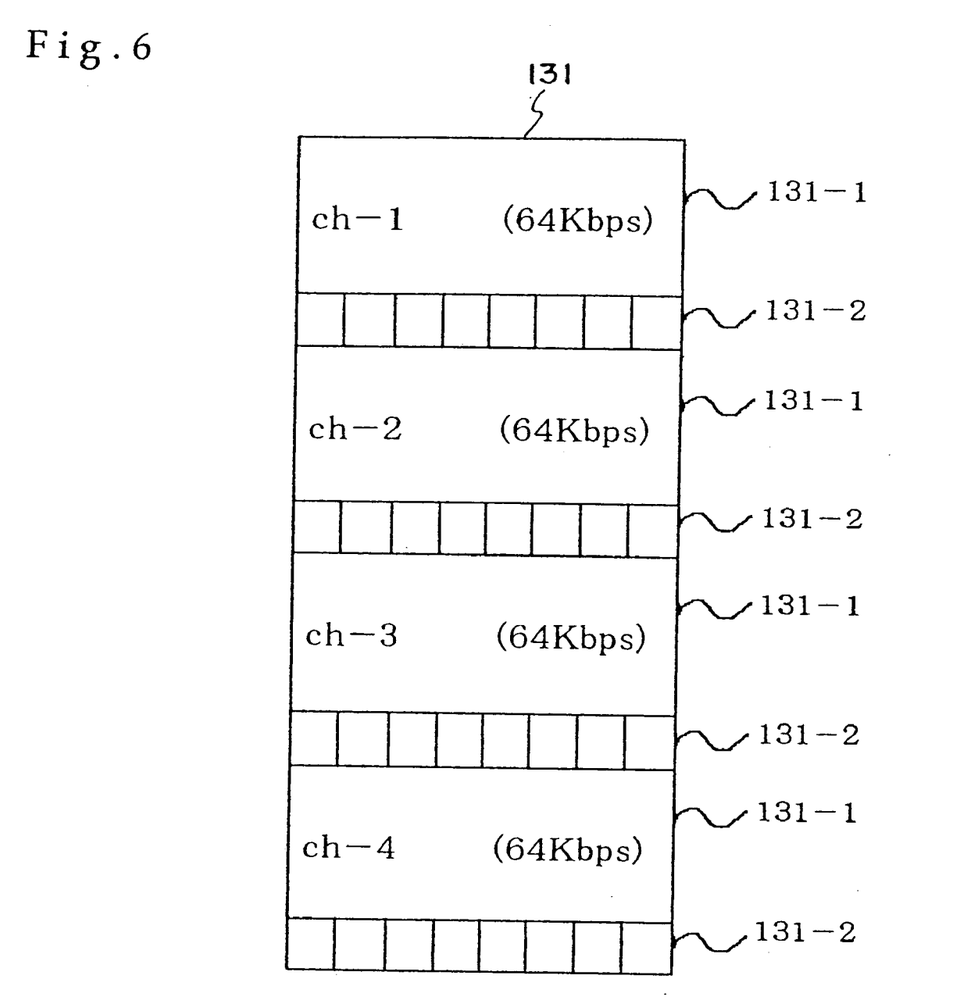
FIG. 6 shows the structure of the data for managing which channel of the SD-I line is used for each band.

FIG. 6 is used to explain one example of the structure of the data for managing the used status of the channel for the sub-rate multiplex (on-demand/reserved band).

A channel used status managing data 131 is mounted for each channel (by a unit of 64 kbps), and the inside is further divided into 8 portions (by a unit of 8 kbps) by a sub-rate unit.

When call is originated from a sub-rate multiplex (on-demand/reserved band) terminal device, the band of the object will be extracted from the areas 130-1 or 130-2 of FIG. 5, and the area 131-2 from the start channel to the end channel of the band is checked, in order to select a channel corresponding to the signaling speed of the originator (channel in sub-rate units). A flag is set to the area 130-2 of the selected channel (by a unit of 8 kbps), indicating that the channel is used.

As for the multiplexing device on the receiver side, the same control for rewriting the channel used status managing data will be performed at the time of receiving the "call setup" message.

As was explained above, in a dynamic band allocation system of a multiplexing device comprised of a network connected by a digital private (SD-I) line, the present invention divides the band on the SD-I line into a sub-rate band which could be used by units of 8 kbps for voice or for data, and a bit multiplex band secured by units of 8 kbps, and further dividing the sub-rate band into an on-demand band which selects the trunk and the channel dynamically (for every call) according to demand, a fixed allocation band for allocating the trunk and the channel in advance and selecting only the trunk corresponding to the speed of the originating terminal device when the call is originated from the terminal, and a fixed connection band where the band is connected at all times where no dynamic connection is possible, wherein the bit multiplex band is for performing a bit multiplex so that the sum of the speed of terminal devices having a small unit such as 1.2 kbps/2.4 kbps is closest to a unit of 8 kbps, the bit multiplex band divided into a fixed allocation band where the trunk and the channel are allocated in advance and selecting only the trunk corresponding to the speed of the originating terminal device when the call is originated from the terminal, and a fixed connection band where the band is connected permanently where no dynamic connection is possible, the trunks and the channels being divided into those for voice and those for data in the on-demand band or the reserved band, the trunks being divided into those for voice and those for data in the fixed allocation band, wherein each band's traffic is observed for a certain interval, and the ratio of division for the voice or for data is set to be changed according to the traffic from time to time, thereby providing a dynamic band allocation system which enables effective use of the digital private (SD-I) line and the trunk.

What is claimed is:

1. A dynamic band allocation method in a multiplexing device constituting a network connected by a digital private (SD-I) line, including a plurality of 8 kbps-unit channels, said method comprising the steps of:

(a) dividing a band of the SD-I line into a sub-rate band, usable in units of 8 kbps for voice communication or for data communication, and a bit multiplex band, usable in units of 8 kbps, wherein said bit multiplex band is a band for performing bit multiplexing so that the sum of the speeds of the multiplexed terminal devices is not greater than an 8 kbps unit;

(b) dividing said sub-rate band into an on-demand band on which a trunk and a channel are selected and connected dynamically in response to a demand, a fixed allocation band on which the trunk and the channel are allocated in advance and only a trunk corresponding to the speed of a calling terminal device is selected when a call is originated from such calling terminal device, and a fixed connection band on which a fixed connection is maintained at all times and no dynamic connection can be made, wherein said on-demand band is formed so that the trunk and the channel of said on-demand band are divided for voice communication and for data communication;

(c) dividing said bit multiplex band into a fixed allocation band on which the trunk and the channel are allocated in advance and only a trunk corresponding to the speed of a calling terminal device is selected when a call is originated from such calling terminal device, and a fixed connection band on which a fixed connection is maintained at all times and no dynamic connection can be made;

(d) responding to origination of a call by a calling terminal device using said on-demand band by selecting a trunk, connecting such calling terminal device with said selected trunk, selecting a channel, connecting said selected trunk with said selected channel, and communicating the call; and (e) changing the ratio of division of said on-demand band usable for voice communication and usable for data communication based on the volume of the traffic.

2. The dynamic band allocation method of claim 1, wherein step (e) comprises increasing the portion of said on-demand band usable for voice communication during daytime when the amount of telephone being used is large, and increasing the portion of said on-demand band usable for data communication during nighttime when the amount of telephone being used is small.

3. The dynamic band allocation method of claim 1 or claim 2, further comprising:

(f) forming a reserved band on the on-demand band to permit selecting and connecting a trunk and a channel dynamically according to demand only when the call is originated from a terminal device which has been set to the on-demand band optionally.

* * * * *